June 28, 1955  L. BOLTUCH  2,711,875
ADJUSTABLE BRACKET
Filed Jan. 18, 1952  2 Sheets-Sheet 1
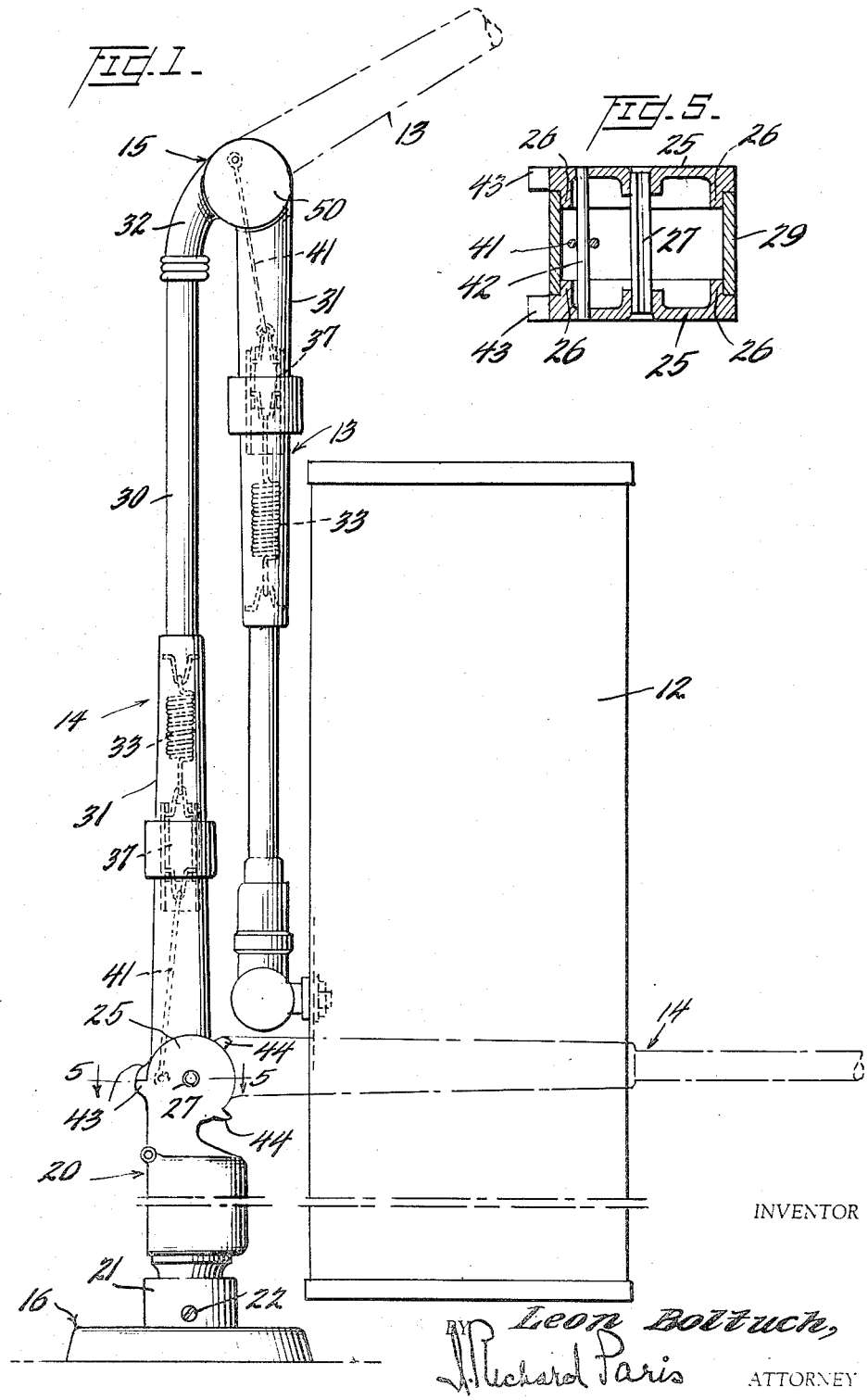
INVENTOR
Leon Boltuch,
J. Richard Paris
ATTORNEY

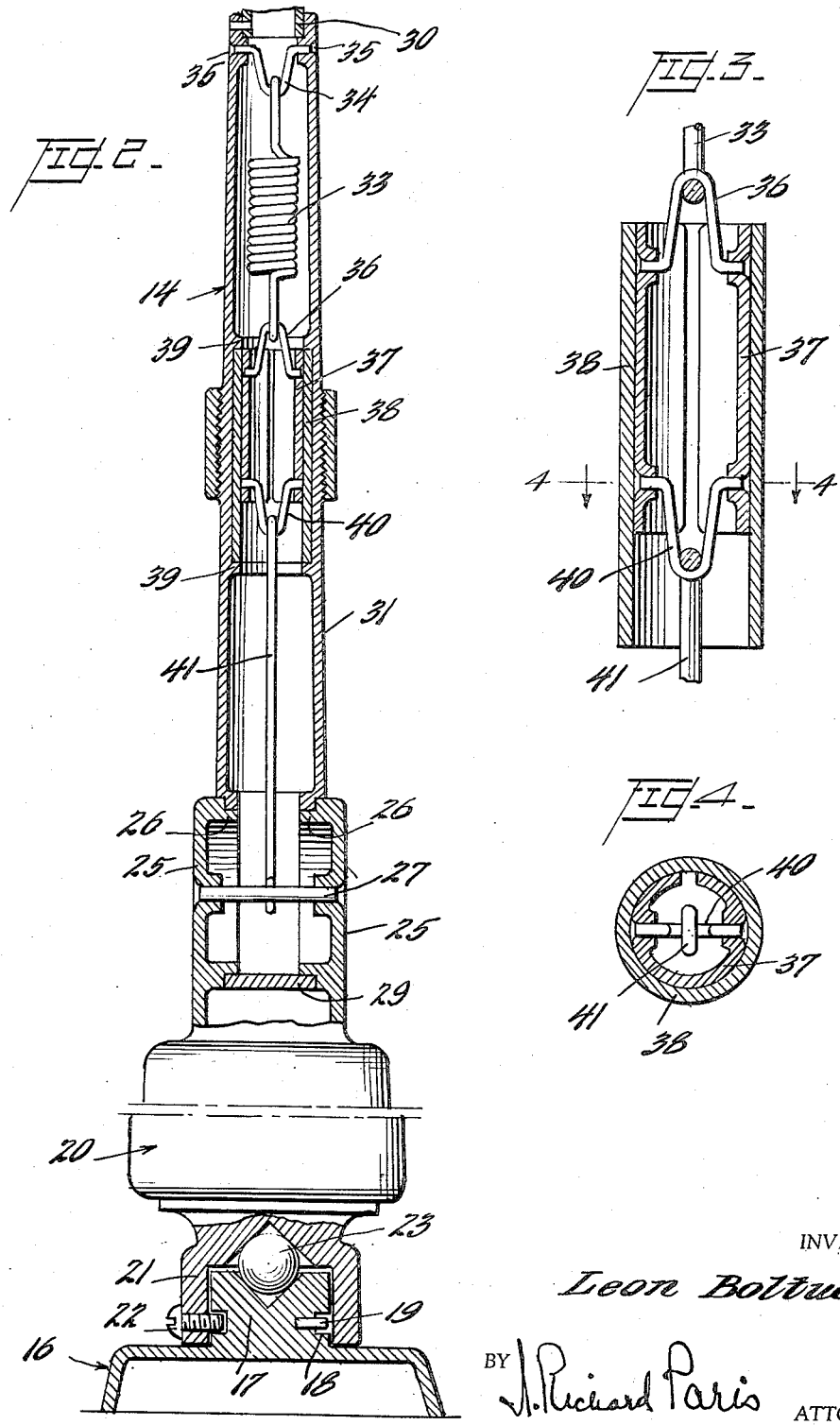

United States Patent Office 2,711,875
Patented June 28, 1955

2,711,875

ADJUSTABLE BRACKET

Leon Boltuch, Wallingford, Conn.

Application January 18, 1952, Serial No. 267,062

5 Claims. (Cl. 248—292)

The present invention relates generally to an adjustable bracket of the type which permits of adjusting the position of the load carried by the bracket to substantially any point within a sphere whose diameter approximates the longest dimension of the bracket. More particularly, the present invention relates to this type of adjustable bracket which is designed to support a relatively light load which is best illustrated in the present application by a desk lamp. It will be understood that while the invention is illustrated herein as embodied in a desk lamp in which an illuminating unit, whether in the form of a conventional electric bulb or in the form of a tubular discharge lamp together with a shade or reflector therefor, constitutes the load, the invention may be employed in adjustably supporting a variety of loads. It will, therefore, be understood that wherever the present specification speaks of a lamp, or a desk lamp, or a table lamp, or an illuminating unit, the language is merely illustrative and is intended to include a variety of other types of loads whether they be in the form of hand tools or electrically driven tools or other such devices.

Essentially the present invention contemplates a base, a bracket carried by the base, and a load carried by the free end of the bracket; the bracket having a universal movement with reference to the base thus permitting for the adjustment of the position of the load unit in any position desired with reference to the base.

One of the objects of the present invention is to provide in an organization of the type described means which firmly maintain the load unit in its adjusted position, while at the same time the means operates to permit movement of the load unit with great facility from the adjusted position to any other desired position.

Another object of the invention is that the means which serves to maintain the load unit in its adjusted position also operates to assist in the movement of the load unit once the movement is set into operation.

A still further object of the invention is to provide counterbalancing means which serve to counterbalance the leverage of the load unit in any selected position without imposing any frictional burdens upon the pivotal connections of the parts involved.

In the specific embodiment of the present invention shown herein, the bracket is jointed and is universally mounted on the base. It is the aim of the present invention to provide counterbalancing means for the leverage of the load unit which does not impose any burdens upon the joint between the two arms of the bracket nor upon the universal pivot of the bracket upon the base.

Another object of the present invention is to provide the cooperation of friction and a spring for counterbalancing the load in any selected position, without subjecting the joints or pivots of the bracket to any undue stresses.

A still further object of the present invention is to provide a bracket construction of the type described in which the counterbalance which includes a friction sleeve, a spring and an operating link are disposed interiorly of the hollow arms, thus concealing the operating elements, enhancing the appearance of the bracket and in addition thereby obviating the need of slots in the tubular arms and minimizing or substantially eliminating radial stresses.

Another object of the present invention is to employ tension springs in the counterbalance, which in operation contract their diameters and substantially eliminate contact between the springs and the walls of the tubes.

Having thus described the general objects of the present invention, reference is now had to the following specification and the accompanying drawings for a full and clear disclosure of all the details thereof, it being understood that these are merely illustrative and that variations thereof falling within the scope of the appended claims will be apparent to persons skilled in the art.

In the drawings:

Fig. 1 is a side view of a preferred embodiment of the invention;

Fig. 2 is a rear view partly in section of the base and lower arm;

Fig. 3 is an enlarged sectional view of the friction element and its associated parts; and Fig. 4 is a sectional view taken on line 4—4 of Fig. 3.

Fig. 5 is a sectional view on line 5—5 of Fig. 1.

The present invention comprehends a base, a pair of jointed arms forming a bracket universally mounted on the base, and a lamp unit or the like, universally mounted on the free end of the bracket.

An important phase of the present invention resides in providing within the bracket devices which operate to exert the desired force to support and counterbalance the bracket and lamp unit in any desired position, the same force also serving to assist in a movement of the lamp unit from one adjusted position to another.

The present invention employs for this purpose a slidable friction element and a resilient power storage element both disposed within the hollow arms. These elements are merged into a single force by means of a linkage which connects these elements to the base or to another arm. The friction element takes the form of a split resilient friction sleeve disposed within the hollow arms of the bracket. The resilient power storage element is in the form of a helical spring disposed within each of the hollow arms and connected to the friction sleeve. The linkage is in the form of a rigid rod-like element attached at one end to the friction sleeve and at the other end to the base or another adjacent portion of the bracket.

The linkage element virtually merges the passive frictional resistance of the friction element with the active power stored within the helical spring into a single effective force which provides a virtually floating support for the lamp unit and which also serves to retain the lamp unit in any adjusted position.

An important feature of the present invention is that the counterbalance unit is disposed interiorly of the bracket arms.

With the above general statement of the principles involved in the present invention, we may now turn to a description of a preferred and specific embodiment.

In the drawings 12 illustrates a lamp housing which in the present case is of the type which houses a pair of luminescent discharge tubes. The lamp unit 12 is carried by a pair of jointed arms 13 and 14 pivoted to each other at 15. The inner arm 14 is universally mounted on the base 16. Thus, by means of this organization, the lamp unit 12 may occupy substantially any position within the sphere having approximately the overall length of the arms 13 and 14 as its diameter. Thus the lamp unit 12 may be moved with the outer arm 13 about the pivot 15 to a position in which the lamp unit illuminates the area closely adjacent to the base 16. This is illustrated by the full line position of the outer arm 13. The dotted line positions illustrate other adjustments of the lamp. In addition, the lamp unit 12 has universal movement about the joint 11.

To provide for the desired universal rotation of the arm 14 relative to the base 16, the standard 20, a two-part die casting, is interposed between the arm 14 and the base 16. The standard 20 is mounted upon the base 16 to provide for rotation of the standard and bracket arms about a vertical axis relative to the base 16. At its upper end the standard 20 receives the lower end of arm 14 in a manner to permit movement of the arm about a horizontal axis. The standard 20 is therefore seated upon the base 16 and embraces the stud 17 which has an annular groove 18 provided with a stop pin 19. The lower embracing neck portion 21 of the standard 20 has an inwardly extending stop pin, here shown in the form of a screw 22 which travels in the groove 18 and engages the pin 19 to limit the movement of the standard on the base.

The steel anti-friction bearing ball 23 is lodged in suitably shaped recesses formed in the stud 17 and the neck 21 of the standard 20.

The standard 20 is preferably hollow to provide for the passage of electric cords and is elongated as shown.

The upper end of the two parts of the standard 20 are shaped to approximate a pair of spaced plate-like elements 25 having a pair of annular flanges 26 in registry with and directed toward each other. The upper end of the standard 20 receives and holds the lower end of the arm 14 and permits its rotation on the flanges 26. The parts of the standard are held in permanent assembly by any suitable means as by the pin 27 or the like.

The bracket arm 14 consists of the tubular portion 30 made of any suitable tubular stock, the counterbalance housing 31, a two-part die casting, which grips the lower end of tube 30, and the hinge 32, a two-piece die casting, which grips the upper end of the tube 30.

Each arm 13, 14 comprises a housing 31 and the counterbalance unit disposed within it. The description of the housing and the counterbalance unit is applicable to both arms.

At its lower end the housing 31 is provided with an annulus 29 which seats and rotates on the annular flanges 26. The interior of the annulus communicates with the interior of the standard 20 as well as with the interior of the housing 31 to permit the passage of electric cord. The annulus 29 is preferably disposed somewhat eccentrically in reference to the tubular or main body portion of the housing 31 as shown, the standard 20 and housing 31 being provided with engaging stops 43 on one side and engaging stops 44 on the other side, which provide limits to the ninety degree movement of the housing 31 with reference to the standard.

The counterbalancing force is provided by the combination of a friction element and a deformable resilient element. The friction element offers a substantially fixed force and the resilient element in the form of a helical spring offers a variable force which increases with the increase of the moment of the load.

The casting 31 serves as a housing for the counterbalancing elements and is suitably shaped and designed to this end. The counterbalancing organization comprises a spring 33, a friction sleeve 37 and a link 41. In the present invention these are housed within the counterbalance housing 31 as shown. The spring, friction element and link are connected so that they cooperate to exert the desired force on the arm. This system of elements is housed within the housing 31 and is anchored at one end to the upper end of the housing 31 and is anchored at its other end to the standard 20.

The spring 33 is carried at one end by the cross member 34 whose ends are received in the sockets 35. At its other end the spring is connected by the cross member 36 which has its ends lodged in sockets in the split resilient steel friction sleeve 37. The friction sleeve may, if desired, ride on the inner face of the housing 31. In order to permit the use of any desirable material in the housing 31, a steel bearing sleeve 38 is lodged in the housing 31 between the shoulders 39 and the resilient split friction sleeve 37 is disposed within the bearing sleeve. The cross bar 40 lodged in sockets in the friction sleeve carries the upper end of the link or pull arm 41, and its lower end is anchored on the pin 42 which is carried by the portion 25 of the standard 20 near its periphery as shown. The arm 14 has a maximum range of movement approximately ninety degrees as shown. The pin 42 is placed on the side opposed to the direction of movement of the arm with the result that as the arm is moved from its upright or full line position to its horizontal dotted line position the link 41 will pull upon the friction sleeve and spring so that the spring is stretched and subjected to considerable tensions as shown. Thus the tension of the spring increases with the increase of the moment of the load and its counterbalancing contributes to the maintenance of the load in its adjusted position against the moment of the force of gravity. At the same time the friction sleeve by its resistance to the spring tension contributes to the maintenance of the load in its adjusted position against the tendency of the spring and link to move the arm in the direction of the vertical position.

The upper end of the tube 30 enters and is gripped by the two-part casting 32 which constitutes a hinge element to receive the upper bracket arm 13 and permit for its movement on a horizontal axis. The hinge 32 is a two-part casting which grips the upper end of the tube 30 at one end. At its other end it has a pair of spaced parallel plates 50 whose structure and function is the same as the plates 25 shown in detail in Fig. 2.

The upper arm 13, like the lower arm 14, has a duplicate housing 31, as described which houses the spring, friction sleeve and link anchored to the hinge plates 50 as shown. Thus the counterbalance device is the same in both arms and the arm 13 operates in the same manner with reference to arm 14 as arm 14 with reference to the standard support 20, except for the fact that the stops at the upper joint permit a movement of the upper arm over a range of approximately 120°. It is also found that the spring in the lower arm needs to be somewhat longer or stronger to the extent of approximately one quarter in excess of the length or strength of the spring in the upper arm.

I claim:

1. A support for a movable load unit comprising in combination, a support member, a hollow arm pivoted on said support member by means of a hollow pivot head for swinging movement through a defined arc, a load unit carried by said arm, first anchoring means in said support member spatially displaced from the pivot axis of said arm on said support member in the direction generally opposite from the line of extension of said arm from said pivot axis, second anchoring means in said arm spatially displaced from said pivot axis, and a counterbalance unit interconnecting said two anchoring means and disposed within said arm comprising a spring, a slidable element frictionally engaging the inside of said arm, and a link, said anchoring means being oriented relative to each other to afford substantially straight line extension and contraction of said counterbalance unit during movement of said arm over the defined arc, with the swinging path traversed by said unit during swinging movement of said arm over said arc being free of obstruction to said unit.

2. The support set forth in claim 1, wherein said spring is connected at one end to the second anchoring means, said link is connected at one end to the first anchoring means, and the slidable element interconnects the non-anchored ends of the spring and link.

3. The support set forth in claim 1, wherein the slidable element comprises a longitudinally split resilient metal sleeve.

4. The support set forth in claim 3, wherein the arm includes an internal bearing sleeve engaged by the slidable element.

5. A support for a vertically swingable load unit adapted to retain the unit in vertically adjusted position comprising, a pair of tubular members, said members carrying at their adjacent ends parts cooperating to form a hollow pivot joint holding the members in assembled relation and providing for relative vertical swinging movement of the members over a defined arc, said parts comprising two parallel plates affixed to a first of said members and having arcuate shoulders facing each other, and an annulus affixed to the second of said members and carried by the shoulders and enclosed between said plates, and a counterbalance unit disposed in and anchored at one end to an anchoring means on the first of said members and anchored at its other end to an anchoring means carried by the parallel plates, said last mentioned anchoring means being spatially displaced from the pivot axis of said joint in the direction generally opposite from the line of extension of said first member from said pivot axis, the counterbalance unit comprising as its essential elements a helical spring, a slidable element frictionally engaging the inside of said first member, and a rod, the elements of the counterbalance unit being connected in series, said two anchoring means being oriented relative to each other to afford substantially straight line extension and contraction of said counterbalance unit during movement of said members over the defined pivotal arc, with the swinging path traversed by said counterbalance unit during swinging movement of said members over said arc being free of obstruction to said counterbalance unit.

References Cited in the file of this patent

UNITED STATES PATENTS

| | | |
|---|---|---|
| 1,199,295 | Morrison | Sept. 26, 1916 |
| 1,357,714 | Lane | Nov. 2, 1920 |
| 1,423,924 | Edwards | July 25, 1922 |
| 1,564,886 | O'Neil | Dec. 8, 1925 |
| 1,791,230 | Weber | Feb. 3, 1931 |
| 1,963,278 | Pieper | June 19, 1934 |
| 2,172,085 | Lagerva II | Sept. 5, 1939 |
| 2,395,178 | Fiori | Feb. 19, 1946 |
| 2,608,367 | Boltuch | Aug. 26, 1952 |